(12) United States Patent
Lonergan

(10) Patent No.: US 9,764,185 B2
(45) Date of Patent: Sep. 19, 2017

(54) TRANSPORTABLE ROWING UNIT

(71) Applicant: Larry Ellsworth Lonergan, Oceanside, CA (US)

(72) Inventor: Larry Ellsworth Lonergan, Oceanside, CA (US)

(*) Notice: Subject to any disclaimer, the term of this patent is extended or adjusted under 35 U.S.C. 154(b) by 0 days.

(21) Appl. No.: 14/821,838

(22) Filed: Aug. 10, 2015

(65) Prior Publication Data

US 2017/0043208 A1 Feb. 16, 2017

(51) Int. Cl.
| | | |
|---|---|---|
| A63B 21/00 | (2006.01) | |
| A63B 22/00 | (2006.01) | |
| A63B 21/008 | (2006.01) | |
| A63B 21/22 | (2006.01) | |
| F16B 7/10 | (2006.01) | |

(52) U.S. Cl.
CPC ...... *A63B 22/0076* (2013.01); *A63B 22/0087* (2013.01); *A63B 21/0088* (2013.01); *A63B 21/225* (2013.01); *A63B 2022/0079* (2013.01); *A63B 2022/0082* (2013.01); *A63B 2210/00* (2013.01); *A63B 2210/50* (2013.01); *F16B 7/105* (2013.01)

(58) Field of Classification Search
CPC ..................................................... A63B 21/00
USPC ....................................................... 482/72, 57
See application file for complete search history.

(56) References Cited

U.S. PATENT DOCUMENTS

| | | | | |
|---|---|---|---|---|
| 4,880,224 | A * | 11/1989 | Jonas ................... | A63B 21/153 482/72 |
| 5,820,528 | A * | 10/1998 | McAndrew .......... | A63B 21/154 482/102 |
| 5,916,069 | A * | 6/1999 | Wang ................... | A63B 21/153 482/57 |
| 6,371,892 | B1 * | 4/2002 | Dreissigacker ...... | A63B 21/227 482/72 |
| 6,960,156 | B2 * | 11/2005 | Smith ................. | A63B 21/0088 482/51 |
| 2004/0043874 | A1 * | 3/2004 | Yang ................... | A63B 21/153 482/72 |
| 2006/0148622 | A1 * | 7/2006 | Chen .................... | A63B 21/153 482/72 |
| 2013/0035216 | A1 * | 2/2013 | Campbell .......... | A63B 22/0076 482/72 |

* cited by examiner

*Primary Examiner* — Andrew S Lo
(74) *Attorney, Agent, or Firm* — Steven W. Webb

(57) ABSTRACT

The unit includes a single rowing and seat component connected to a simplified braking mechanism. The sliding seat is attached to a dual track frame. The rowing component includes a handle attached to a deep profile sprocket and synchronous belt attached to a flywheel. The unit folds onto itself, and telescopes together compacting and weighing approximately 27 pounds for transport in a small carry case.

3 Claims, 1 Drawing Sheet

TRANSPORTABLE ROWING UNIT

BACKGROUND OF THE INVENTION

Field of the Invention

This invention pertains to exercise devices and exercise rowing units, particularly to units that are light weight, that fold and telescope in such a manner as to become compact in size. It also pertains to units which provide a feel which is similar to the actual sensation of rowing.

Description of the Related Art

In the prior art it is typical to have a friction brake to provide the resistance for training. These units are inherently inferior and wear out quickly. There have been improvements to the above described devices such as shown, for instance, in U.S. Pat. No. 3,315,959, issued Apr. 25, 1967 to G. Carnielli, for A Hinge and Braking Device for Stationary Rowing Exercising Apparatuses. Other devices which can be used as examples of current state-of-the-art devices are in the patent issued to A. R. Johnson on Aug. 16, 1966, U.S. Pat. No. 3,266,801 for a Fluid-Operated Rowing Machine and in the patent issued to P. Elia et. al., U.S. Pat. No. 3,380,737 on Apr. 30, 1968, for Rowing-Type Exercising Equipment plus in the patent issued to Dreissigacker et. al., U.S. Pat. No. 4,396,188 issued Aug. 2, 1983 for a Stationary Rowing Unit.

As shown in these patents, the devices provide a sensation of rowing. The machine themselves are built around a large footprint with weight that requires two people to transport the unit. Storage of these units is also another factor.

BRIEF SUMMARY OF THE INVENTION

It is a particular object of this invention to set forth a unit that is easy to store, transportable, and weight of approximately 27 pounds. A unit that that folds and telescopes together on itself and is carried in a small carry case. Further, a unit with a belt and sprocket coupled with rotating flywheel providing resistance. Said flywheel is connected to the main shaft assembly which is attached to the frame, Also a sliding seat, and adjustable foot positioning element. A braking means for said flywheel, handle means interposed between said rowing means, driving flywheel and return means for said drive are integrated to the device.

Further objects and features of this invention will become more apparent by reference to the following description.

DETAILED DESCRIPTION OF THE INVENTION

Figure 1:
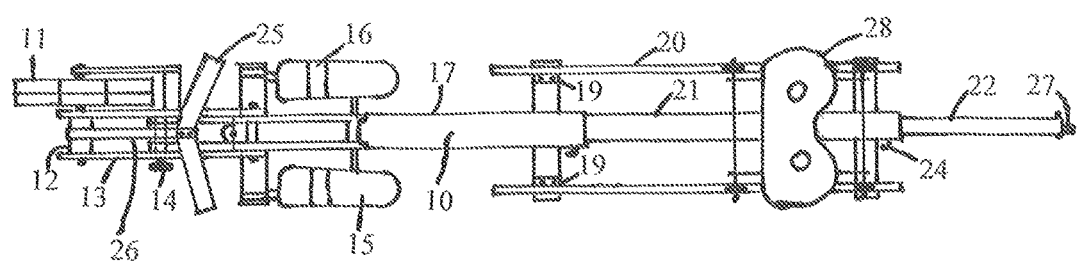
FIG. 1 is a top plan view of the transportable rowing unit.
Figure 2:
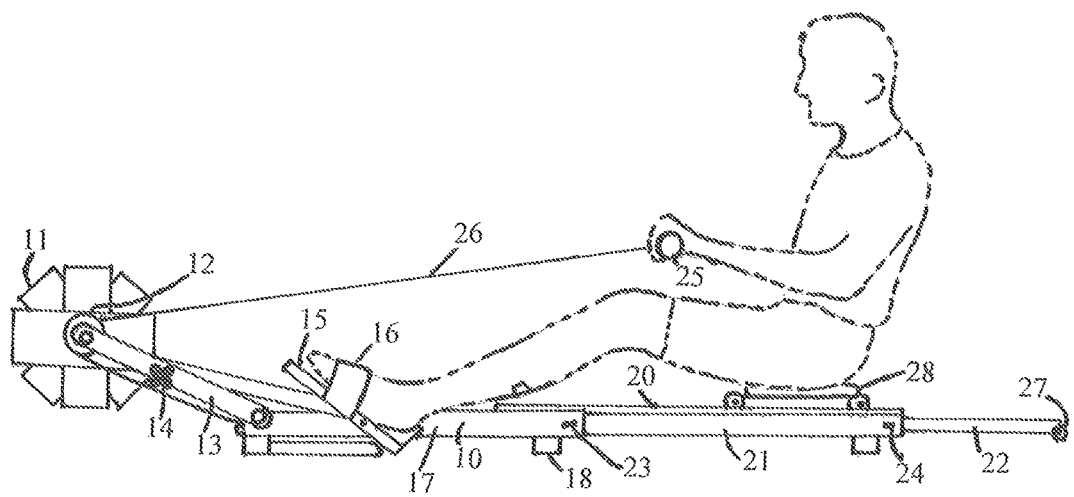
FIG. 2 is a side elevation view thereof.
Figure 3:
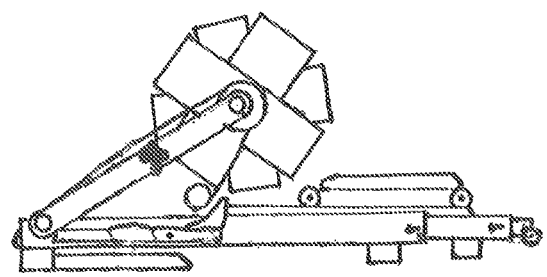
FIG. 3 is a side elevation view of rowing unit in transportable position.

As shown in the figures, the invention is a transportable rowing unit 10, comprised of a wind resistant flywheel 11, a gearing mechanism 12 connected rotatably with said wind resistant flywheel 11, said flywheel 11 and gearing mechanism 12 held in place by fold frame assembly 13, comprised of a locking nut mechanism 14 and the fold frame assembly 13, said fold frame assembly 13 connected rotatably to a foot stretcher 15, with attached strap 16, attached to main frame square tube 17, cross member 18 is attached to tube 17, said tube 17 possessing fixedly attached seat rails 19,20, said tube 17 enclosing slideably telescoping square tube 21, which telescoping square tube 21 slideably encloses smaller telescoping square tube 22, which telescoping and smaller telescoping square tubes 21,22 are released by cam pins 23 and 24, respectively. This arrangement allows sections of the invention to slide into one another for compact transport.

To use the invention, rower grasps handle 25, attached to synchronous belt 26, and pulls on said handle 25, which by pulling, drives gearing mechanism 12, and flywheel 11; elastic system 27 returns handle 25 to static position. Seat car 28, moves rower fore and aft along seat rails 19,20.

While I have described my invention in connection with a specific embodiment of function and portability thereof it is to be clearly understood that this is done only by way of example. It is not as a limitation to the scope of my invention as set forth in the objects thereof and the appended claim.

I claim:

1. A transportable rowing unit, said rowing unit comprised of a horizontally extended frame, a foldable frame assembly, a pulling handle and pull cable, and a seat car, the horizontally extended frame comprised of a main frame comprised of square cross section metal tubing with a nested square tube located slideably within the horizontally extended frame, the nested square tube possessing a smaller-diameter nested square tube within it, the nested square tube and the smaller-diameter nested square tube prevented from sliding within each other and said horizontally extended frame and held in place by means of two cam pins, the horizontally extended frame connected at one end to a foldable frame assembly, said assembly comprised of a foldeable frame, said foldable frame foldable around a lock nut, the foldable frame possessing at its end a wind-resistant flywheel and a gearing mechanism, the gearing mechanism connected via pull cable around the axis of the wind-resistant flywheel to the pull handle, the other end of the pull cable passing through said horizontally extended frame and the nested and smaller-diameter nested square tubes to an elastic system positioned at the end of the smaller-diameter nested square tube, said seat car mounted slideably on two sliding rails which are attached fixedly to the horizontally extended frame.

2. The transportable rowing unit of claim 1 where the horizontally extended frame, the nested and smaller-diameter nested square tubes are comprised of tube steel.

3. A method of use for the transportable rowing unit of claim 1 to prepare it for transport, comprised of the steps of collapsing the smaller-diameter nested square tub into the nested square tube after releasing the cam pins, collapsing the nested square tube into the horizontally extended frame, folding the foldable frame towards the rest of the rowing unit around the lock nut after releasing the lock nut, tightening the lock nut.

* * * * *